United States Patent [19]

Stanley

[11] 4,335,145
[45] Jun. 15, 1982

[54] METHOD FOR CONTROLLING THE FLOW OF FRUIT AND FRUIT JUICE THROUGH A JUICE EXTRACTION FACILITY

[75] Inventor: Robert C. Stanley, Lakeland, Fla.

[73] Assignee: FMC Corporation, Chicago, Ill.

[21] Appl. No.: 171,917

[22] Filed: Jul. 24, 1980

[51] Int. Cl.³ ............................................. G01N 33/14
[52] U.S. Cl. .................................... 426/231; 99/495; 198/590; 426/489
[58] Field of Search ............... 426/231, 489, 616, 599, 426/330.5; 99/495, 484; 100/45; 198/580

[56] References Cited

U.S. PATENT DOCUMENTS

2,309,328  1/1943  Polk, Sr. et al. ..................... 426/489
4,109,314  8/1978  Meyer et al. ......................... 426/231

Primary Examiner—Raymond N. Jones
Assistant Examiner—George C. Yeung
Attorney, Agent, or Firm—Louis J. Pizzanelli; Richard B. Megley

[57] ABSTRACT

A method for controlling the flow of fruit and fruit juice through a juice extraction facility are disclosed. The juice extraction facility includes a bulk storage location for the fruit, a sizer for separating the fruit into size categories, a feeder for feeding the fruit from the storage location to the sizer, a plurality of juice extractors arranged into groups corresponding to the fruit size categories, means for recycling excess fruit from each group of extractors to the fruit storage location, and a juice storage tank. The measured variables include the level in the juice storage tank and the amount of fruit being recycled from each group of extractors to the fruit storage location. The control objectives include equalizing the fruit flow to each group of extractors, minimizing the amount of recycled fruit from each group of extractors, and maintaining the proper level in juice storage tank.

3 Claims, 8 Drawing Figures

FIG_1

FIG-2

FIG_3B

FIG_3C

FIG_4

FIG_5

FIG_6

METHOD FOR CONTROLLING THE FLOW OF FRUIT AND FRUIT JUICE THROUGH A JUICE EXTRACTION FACILITY

BACKGROUND OF THE INVENTION

1. Field of the Invention

The present invention generally pertains to a method and system for controlling the flow of fruit and fruit juice through a juice extraction facility, and more particularly, it pertains to a method and system for providing the optimal number of fruit to the extraction facility at all times.

2. Description of the Prior Art

The production of juice and other products from whole citrus fruit has become a major industry in the United States. Large citrus processing plants produce a variety of products from citrus fruit including fresh citrus juice, frozen concentrated citrus juice, citrus peel oil, citrus flavoring, and dried pulp for cattle feed. The heart of any such processing plant is the juice extraction facility wherein primary separation is achieved between the juice and juice cells on the one hand and remaining portions of the citrus fruit on the other hand. The juice and juice cells are discharged into a juice storage tank and thereafter directed to a finisher wherein excess juice cells are removed. The pure juice may then be canned, frozen or marketed fresh, as desired. The remaining portions of fruit, including the peel, peel oil, seeds, core material and membrane material, are processed further to produce the other products.

The actual separation of the juice and juice cells from the remainder of the whole fruit is accomplished by a number of juice extraction machines, usually called extractors. These extractors, described in detail hereinafter, are each adapted to receive fruit in a particular range of sizes. It is necessary therefore, to separate the fruit into size categories prior to feeding the rate to the extractors. With this in mind, the operations within a typical juice extraction facility will be explained.

Figure 1:
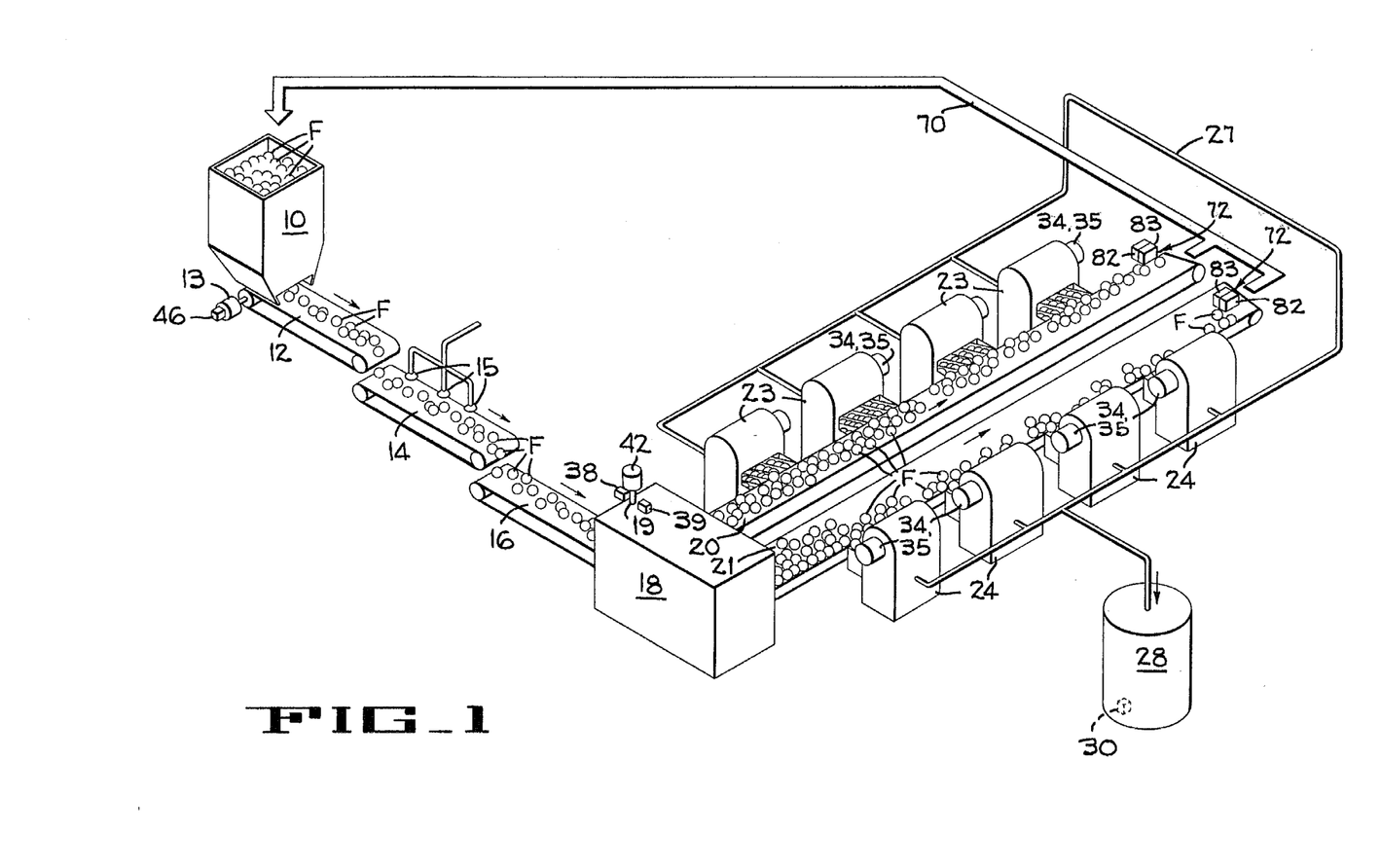
FIG. 1 is a schematic representation of the flow of fruit and fruit juice within a juice extraction facility.

Reference will now be made to FIG. 1 which illustrates the layout of equipment in a typical juice extraction facility. Fruit F is stored in bulk in a storage bin 10 which receives freshly harvested fruit by the truckload from the citrus grove. In addition to such raw fruit, a stream of recycled fruit is directed to the storage bin 10, as described hereinafter. A feed conveyor 12, driven by a variable speed motor 13, withdraws fruit from the bottom of the storage bin 10. From the feed conveyor 12, the fruit is deposited on a washing conveyor 14 where said fruit is washed by plurality of overhead water spray nozzles 15. The fruit next proceeds to a sorting conveyor 16 where unesirable fruit are manually removed from the feed stream.

After being washed and manually sorted, the fruit F is automatically separated according to size by a sizer 18. The sizer 18 divides the fruit F into two or more size categories corresponding to the size ranges of the extractors. Sizer 18 in FIG. 1 is shown to divide the fruit into two categories, i.e., small (below 3 inch diameter) and large (3 to 4 inch diameter). Oversize fruit with a diameter larger than 4 inches is directed away from the process stream. It will be understood, however, that the present invention is applicable to a system with any number of size categories.

The sizer 18 may be of any type capable of segregating the fruit into the size categories mentioned. One such sizer that has been found adequate is a "belt and roll sizer". In such a sizer, fruit is fed down two or more sizing runs. Each sizing run comprises a feed belt positioned adjacent a roller bar. The distance between the belt and the roller bar determines the size of the fruit which falls down to an associated discharge conveyor, with one discharge conveyor corresponding to each of the size categories. In sizer 18, a first sizing run is adjusted to allow fruit of 3" diameter and smaller to drop to a first discharge conveyor and a second sizing run allows fruit 4" diameter and smaller to drop to a second discharge conveyor. Fruit larger than 4" is removed by the oversize fruit discharge conveyor (not shown). Adjustment of the distance between the roller and the conveyor of the first sizing run adjusts the cut point beteen the large and small size categories and is accomplished by rotating a sizer adjustment shaft 19.

From the sizer 18, the fruit F is removed on two tilted-belt discharge conveyors 20, 21. These conveyors are adapted to feed the fruit F to a plurality of individual juice extracting machines 23, 24, as discussed hereinafter. The belts are each tilted toward the side where the extractors are located so that the fruit will gather along that side. A retaining wall 26 (see FIG. 4) disposed at the lower side of each conveyor 20, 21 prevents the fruit F from falling off the conveyor belt. The wall 26 has an opening associated with each of the extractors to allow the fruit F to feed into that extractor. It will be appreciated that the number of fruit carried by the tilted-belt conveyor diminishes along the length of the conveyor as individual fruit are consumed by the extractors. Ideally, the precise number of fruit will enter each conveyor so that all extractors have fruit available at all time with a small excess of fruit to insure proper feed to the final extractor. Provisions are made at the end of each tilted-belt conveyor 20, 21 to drop the fruit to a recycle conveyor 70 (see FIG. 4) disposed below the tilted-belt conveyor, which recycle conveyor returns the unused fruit to the storage bin 10.

The juice extractors 23, 24 are each equipped with a plurality of individual cups of a preselected size, each cup being adapted to extract the juice from a single piece of fruit at a time. In the juice room of FIG. 1, four small extractors 23 are grouped together to receive the smaller fruit carried by conveyor 20. Each extractor 23 has five cups which together can process over 300 fruit per minute. Similarly, four large extractors 24 are grouped to receive the larger fruit from conveyor 21. Each extractor is powered by an extractor drive motor 35.

The operation of both the small extractors 23 and the large extractors 24 is the same. Fruit is fed singly from the tilted-belt conveyors 20, 21 into the extracting cups of the extractors. Each piece of fruit is received by a stationary lower cup which automatically centers and positions it for extraction. An upper cup descends, and as numerous metal fingers of the two cups intermesh, pressure is applied evenly to all surfaces of the fruit. The bottom of the lower cup contains a stainless steel cutter tube leading to the finishing tube and manifold. The cutter tube cuts a small circular plug in the bottom of the fruit, and as pressure is applied by the cups, the complete inside of the fruit is pressed into the finishing tube where the juice and juice cells are instantaneously separated from the seeds and section membrane. Only pure juice and juice cells are discharged into the juice collection system, as described hereinafter. The construction and operation of such extractors are explained in the patents to Belk et al, U.S. Pat. No. 2,780,988 and to Hait, U.S. Pat. No. 2,649,730.

Extractors of a given size are grouped together and arranged to receive fruit within the particular size category. The extractor facility disclosed in FIG. 1, includes two groups of four extractors 23, 24, one group associated with each of the two tilted-belt conveyors 20, 21. Juice outlet lines from each of the extractors 23, 24 are joined together in the juice manifold system 27 and the juice from all extractors is fed to a juice storage tank 28.

Juice extraction facilities, such as the one described hereinbefore, have heretofore been controlled manually. From a control room, the user has been able to view the fruit flow down each of the tilted-belt discharge conveyors. A remote indication of the juice level in the juice storage tank is also available. The control options have been limited. First, the user could turn down the feed rate from the fruit storage location when it is obvious that an excess amount of fruit is being recycled from either or both of the tilted-belt conveyors. Second, when one conveyor is carrying a disproportionately large share of the fruit, it was possible to adjust the size to balance the flows. This adjustment was difficult, however, since the effect was not observed until some time after the adjustment was made. The final control option heretofore was to turn off and on individual extractors as required. The user could turn off extractors when the level in the juice tank was high, or when extractors in a given size category was receiving an inadequate number of fruit. The user could turn on extractors when the juice level was low, or excess fruit was being recycled from a given group of extractors. With such manual control, it was impossible to optimize operation to achieve maximum product output with minimum power consumption.

There has long been a desire to provide an automatic control system to optimize the flow of fruit and fruit juice in a juice extraction facility. The advantages of such optimization would be to (1) reduce power consumption by running extractors only when sufficient fruit is available to feed each extractor, (2) avoid damage to fruit through excessive recycling, and (3) balance the flow between different groups of extractors by properly adjusting the cut point between fruit size grades going to each extractor line whereby maximum utilization of extractors is achieved.

Control of the juice extraction facility presents a number of unique problems. Simply measuring the fruit flow of each of the tilted-belt conveyors proves to be a difficult task. Moreover, the transport delays between making an adjustment and observing the effects of said adjustment further complicate the control scheme. For example, the time delay between shutting down an extractor and observing a reduced juice flow to the juice tank is in the order of several minutes. The time delay between adjusting the sizer and observing the load change in fruit carried by each of the several conveyors is also in the order of minutes. Finally, the time lag between changing the feed rate of fruit from the fruit storage location and observing that change in the number of fruit fed to the extractors may be as long as two minutes. For these reasons, common process controllers are incapable of controlling this process.

SUMMARY OF THE INVENTION

The present invention solves the aforementioned problems by providing a control method and system which takes into account the time delays encountered in the juice extraction process. A central processing unit (CPU) receives process data from sensors located at various remote locations, processes that data according to a specially designed control scheme, and transmits the necessary control actions to various final control devices. Sensor means are provided to count the number of fruit being recycled from each of the groups of extractors to the storage locations. A level sensor is mounted on the juice storage tank. With this information, the CPU is able to calculate the recycle from each group of conveyors, the total recycle from all groups of conveyors combined, and the juice level in the tank. Using these calculations, the CPU performs a hierarchy of control functions. First, the number of extractors operating will be adjusted to maintain proper level of juice in the juice storage tank. Second, the relative number of fruit directed to each group of extractors will be adjusted to maintain the proper balance between fruit flow to each group. Third, the flow rate of fruit to the sizer will be varied so that extractors are neither starved nor overfed. The control scheme accounts for the time delays inherent in the control loops to ensure stable control.

The CPU also preferably adjusts for interactions between the control loops at the time the initial adjustment is made. For example, when an extractor is added or subtracted, an adjustment is made to fruit feed rate to account for the change in the number of fruit being processed.

In the preferred embodiment, the means for counting fruit being recycled from each of the conveyors comprises a pair of photodetector units positioned above the feed belt at a location just prior to the recycle point. The photodetectors are spaced apart transversely so that the first photodetector will detect fruit travelling in a first row adjacent the retaining wall next to the conveyor belt and the second photodetector will detect fruit carried in a second row lying above the first row.

It has been found desirable to maintain a sufficient flow of fruit to each group of extractors so that the overflow from that group equals the number of fruit in a single row. Additional fruit is considered excess. The CPU interrogates both photodetectors over a fixed time interval and a number corresponding to the occupancy rate of the two rows is calculated. The control point is one-half occupancy of the two rows which corresponds to the number of fruit carried by a single row.

DESCRIPTION OF THE PREFERRED EMBODIMENT

The juice extraction facility control system comprises a real time computer capable of receiving data from remote locations and transmitting control signals to remote actuators, remote sensors for gathering the necessary process data, and final control elements for implementing the necessary process changes calculated according to a predetermined computer program. The real time computer (not shown) includes a power supply, input and output circuitry, and a central processing unit (CPU).

Referring to FIG. 1, the remote sensors include a level sensor 30 located at the bottom of the juice storage tank 28, two flow sensor assemblies 72, one associated with each of the tilted-belt conveyors 20, 21, and a pair of limit switches 38, 39.

The final control elements include a sizer adjustment motor 42 coupled to the sizer adjustment shaft 19, motor control centers 34 associated with each of the extractors and adapted to permit remote starting and stopping of the extractor drive motor 35, and a motor speed control 46 associated with the feeder motor 13 and adapted to vary the feed rate from the storage bin 10. The limit switches 38, 39 prevent the sizer adjustment motor 42 from overdriving the sizer adjustment shaft, as described hereinafter.

The objects of the subject control system are (1) to maintain the proper level in the juice storage tank 28, (2) to equalize the flow of fruit among the various groups of extractors, and (3) to shut down unnecessary extractors. The control objectives, however, are not independent and adjustments made to the system to meet one objective will often have an effect on another parameter. For this reason it is necessary that an integrated control system which anticipates and accounts for these interactions be implemented.

Figure 2:
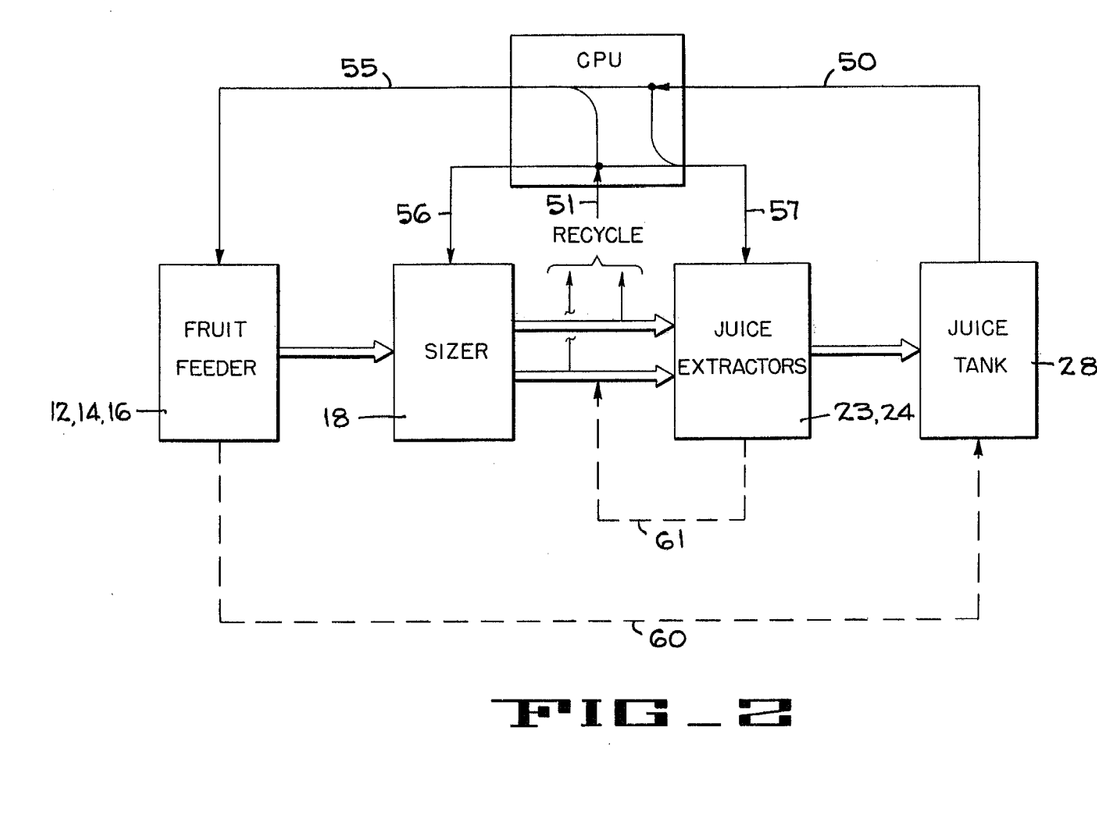
FIG. 2 is a schematic representation showing the interrelation among control loops of the present control method and system.

FIG. 2 illustrates the control loops and the feedback from load changes found in a juice extraction facility controlled by the present invention. Solid lines represent information gathered by the CPU and control actions initiated by the CPU. For example, line 50 represents the tank level signal fed by level sensor 30 to the CPU, while line 55 represents the signal from the CPU which controls the fruit feed rate. Broken lines represent the natural feedback within the process itself. For example, line 60 represents the feedback which occurs when a change is made in the fruit feeding rate, i.e., a change is observed in the level of the juice storage tank 28.

The control system includes two input lines 50, 51 to the CPU and three output lines 55, 56, 57 from the CPU. Input line 50 represents the level in juice tank 28. Input line 51 represents the numbers of fruit being recycled from each group of extractors. In the exemplary process, there would be two signals, the first corresponding to the recycle from the group of small extractors 23 and the second corresponding to the recycle from the group of large extractors 24. Output line 55 represents the control signal which adjusts the rate at which fruit is fed from the storage location 10 to the sizer 18. Output line 56 represents the control signal which adjusts the size limits of the size categories imposed by the sizer 18. Finally, output line 57 represents the control signals which start and stop the extractors.

The input lines and output lines are combined to form four control loops, including three primary control loops and one secondary control loop, as set forth in Table 1, below. These control loops will be discussed in detail hereinafter.

TABLE 1

| NO. | INPUT | OUTPUT | CONTROL OBJECTIVE |
|---|---|---|---|
| PRIMARY CONTROL LOOPS | | | |
| 1. Tank Level (50) | | Extractors (57); Feed Rate (55) | Control level in tank 28 at desired value. |
| 2. Numbers of Fruit Recycled (51) | | Sizer Adjustment (56) | Equalize number of fruit recycled from each group of extractors. |
| 3. Numbers of Fruit Recycled (51) | | Feed Rate (55) | Minimize the total number of fruit being recycled. |
| SECONDARY CONTROL LOOPS | | | |
| 4. Number of Fruit Recycled (51) | | Extractors (57); Feed Rate (55) | Equalize number of fruit recycled from each group of extractors. |

The first primary control loop (No. 1) provides control of the number of extractors operating based on the measured juice level in the juice storage tank 28. The control loop also provides concurrent adjustment of the feed rate from the bulk storage location 10 to compensate for the change in the number of fruit being processed. That is, the feed rate of fruit is reduced when extractors are stopped and increased when extractors are started.

Such a change in the number of extractors operating also has an effect on the number of fruit being recycled from the particular group of extractors affected (23 or 24). As soon as the extractor is shut down in one group, the fruit recycled from that group will become excessive. This feedback in the process is represented by broken line 61. The imbalance created by starting or stopping individual extractors is corrected by the second primary control loop (No. 2), as described hereinafter.

For efficient operation of the juice extractor facility, it is desirable that the number of fruit recycled from each group of extractors 23, 24 be equal to a predetermined minimum number, as discussed hereinbefore. This control objective is achieved in two steps. First, the numbers of fruit being recycled from both of the groups 23, 24 are equalized by the second primary control loop (No. 2). Then, after the recycles have been balanced, the aggregate number of fruit recycled from both groups of extractors is adjusted so that the aggregate recycle from both groups will be proper.

The second primary control loop (No. 2) equalizes the number of fruit being recycled from each of the tilted-belt conveyors 20, 21. Through line 51 (FIG. 2), the control system senses the number of fruit being recycled from each group of extractors 23, 24. When an imbalance is detected, the control system adjusts the sizer 18 through line 56 to provide more fruit to the group of extractors with a deficiency and fewer fruit to the group of extractors with a surplus.

When a variation occurs in the size distribution of fruit F to the sizer 18, an imbalance in the number of fruit recycled from each group of extractors 23, 24 will soon occur. The imbalance is sensed by the control system and an adjustment is made to the sizer 18 to compensate for the imbalance, as described hereinbefore. The amount of sizer 18 adjustment is limited, however, by the ability of the extractors to receive outsize fruit. Should a limit be reached, the control system takes an alternate action. The secondary control loop (No. 4) senses that the sizer 18 has reached its maximum adjustment and an extractor is stopped in the group which is experiencing insufficient recycle.

The third primary control loop (No. 3) adjusts the fruit feed rate to the sizer 18 in order to control the aggregate number of fruit being recycled from both groups of extractors 23, 24. The control system adds the individual recycle rates obtained through line 51 (FIG. 2) calculates the required adjustment, and transmits the control signal through line 55.

The control system responds primarily to two types of load changes. First, the size distribution of fruit will vary with each truckload of fruit brought to the processing plant. Second, the rate at which fruit juice is drawn from the juice storage tank 28 will vary depending on the usage downstream. Both these load changes require the control system to respond in order to compensate and maintain efficient operation of the extraction facility.

For example, assume the extraction facility is operating under steady-state conditions with an equally divided mixture of small and large fruit. If the next load of fruit received is predominantly small, the equilibrium will be disturbed. The group of small extractors 23 will receive excessive fruit while the large extractors 24 will suffer a deficiency of fruit. The control system will react by attempting to equalize the number of fruit fed to each group of extractors by adjusting the sizer 18.

If the number of small fruit far exceeds the number of large fruit, the sizer 18 will be unable to restore balance. In that event, the control system will stop an extractor in the group which is experiencing insufficient recycle. Such control action is secondary to control achieved by adjusting the sizer 18 and designated as loop No. 4 on Table 1. Since an extractor has been stopped, the feed rate of fruit to the extractors will be reduced concurrently by the control system. It should be noted that the control system will never start an extractor to correct for such an imbalance. This is because the number of extractors operating is based primarily on the level in the juice storage tank 28. To start an extractor might cause the tank to overflow.

Once an extractor is stopped to equalize the recycle from each group, it follows that the aggregate recycle from both groups of extractors 23, 24 will be excessive. This excess will be corrected by reducing the feed rate to the sizer 18 by control loop No. 3.

The control system is also able to compensate for changes in the level of the juice storage tank 28 brought about by variations in the amount of juice withdrawn therefrom. Any deviation in the desired level is detected by the control system and a change in the number of extractors operating is affected by control loop No. 1. Since a change in the number of extractors operating wil affect the aggregate number of fruit being recycled from the extractor groups 23, 24, the feed rate to the extractors is simultaneously adjusted to compensate for this change. Furthermore, since a single extractor belonging to a single group of extractors will be affected, the balance between the recycles from both groups of extractors will be upset. Balance between the recycles is restored in much the same manner as described hereinbefore. Control loop No. 2 adjusts the sizer 18 to restore the balance. Normally, sizer adjustment will be sufficient since the control system is programmed to stop and start extractors in a sequence that allows the sizer to operate from the center of its sizing range.

Figure 3A:
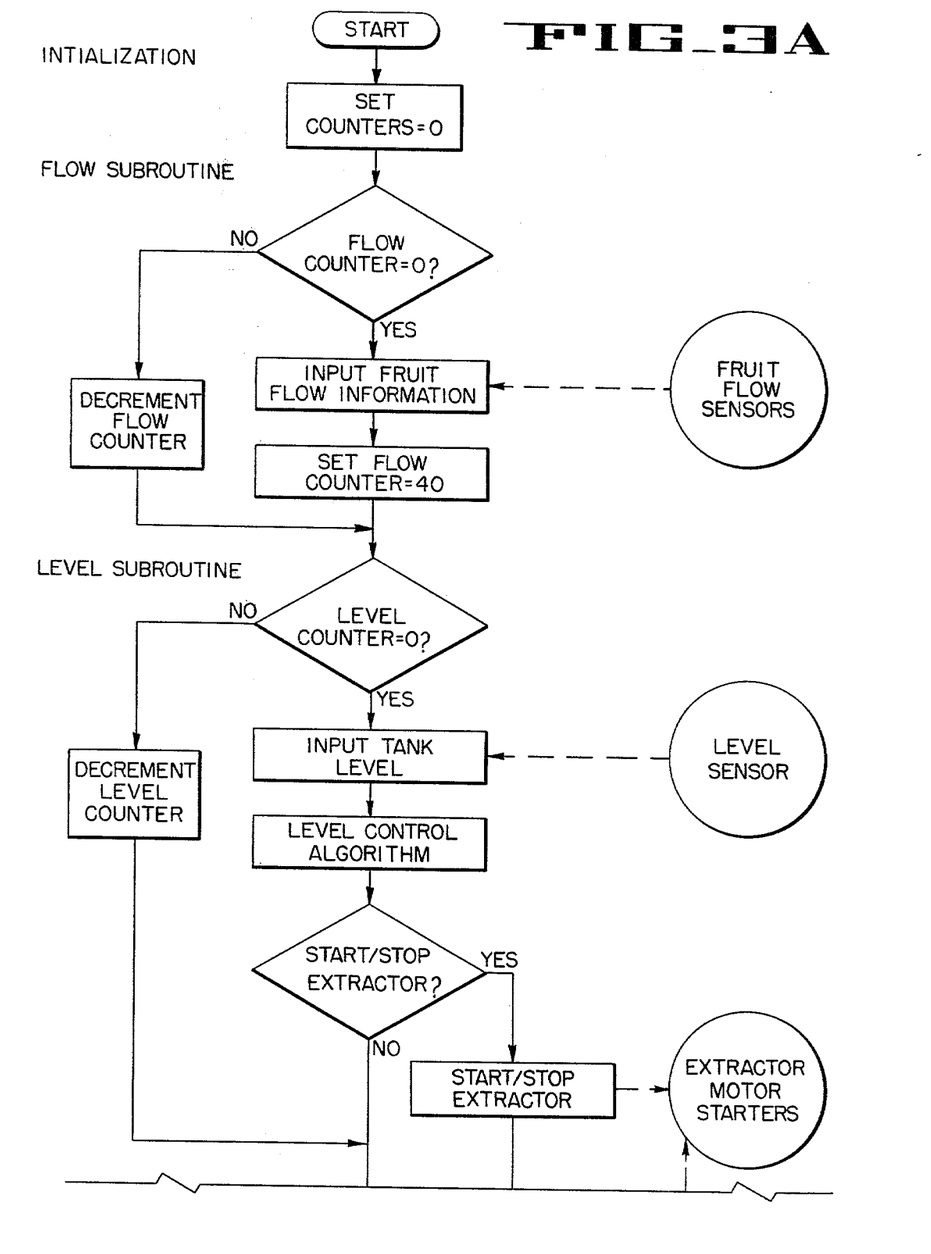
FIGS. 3A, 3B and 3C are a flow chart illustrating the programming of the CPU of the present invention.
Figure 3B:
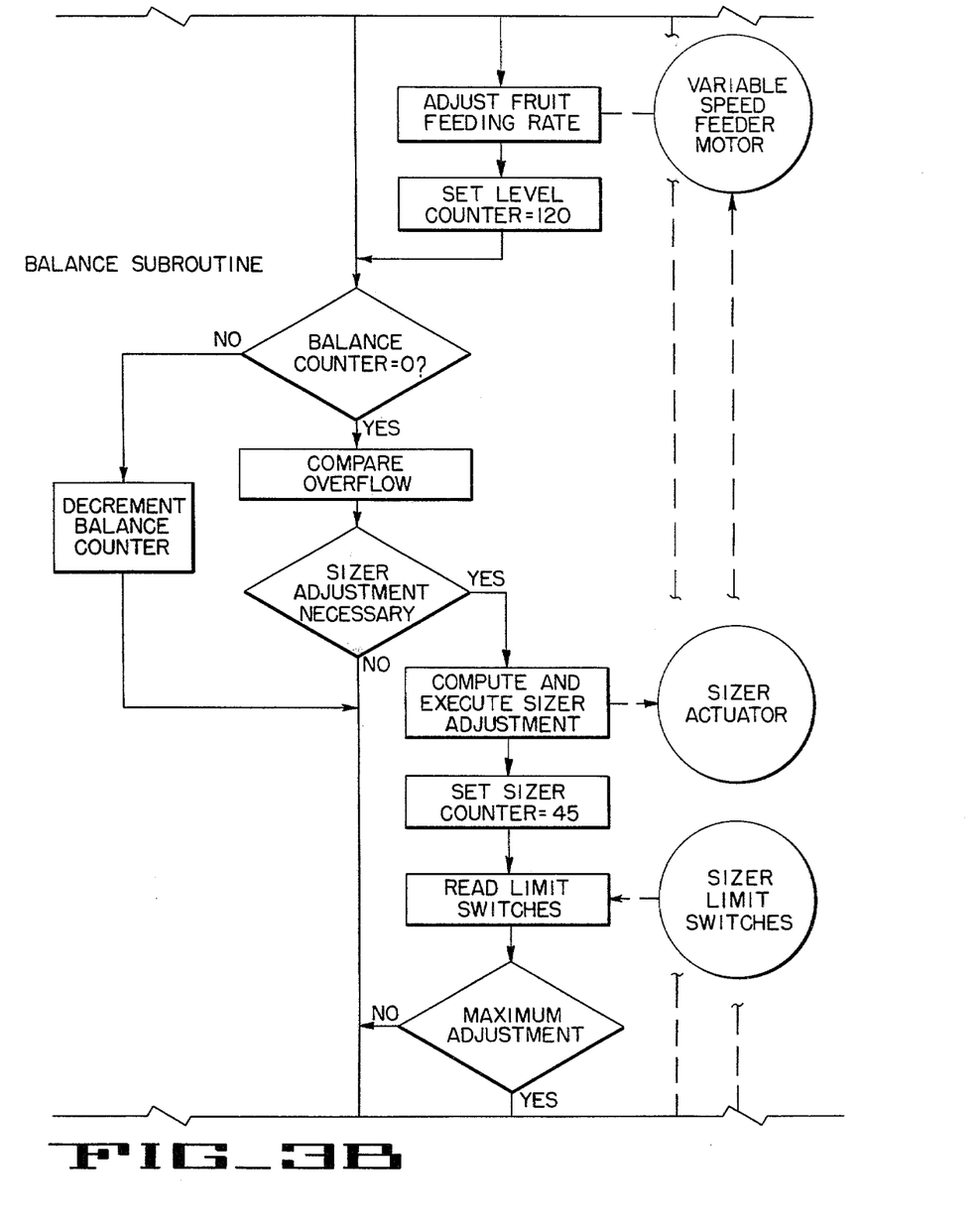
Figure 3C:
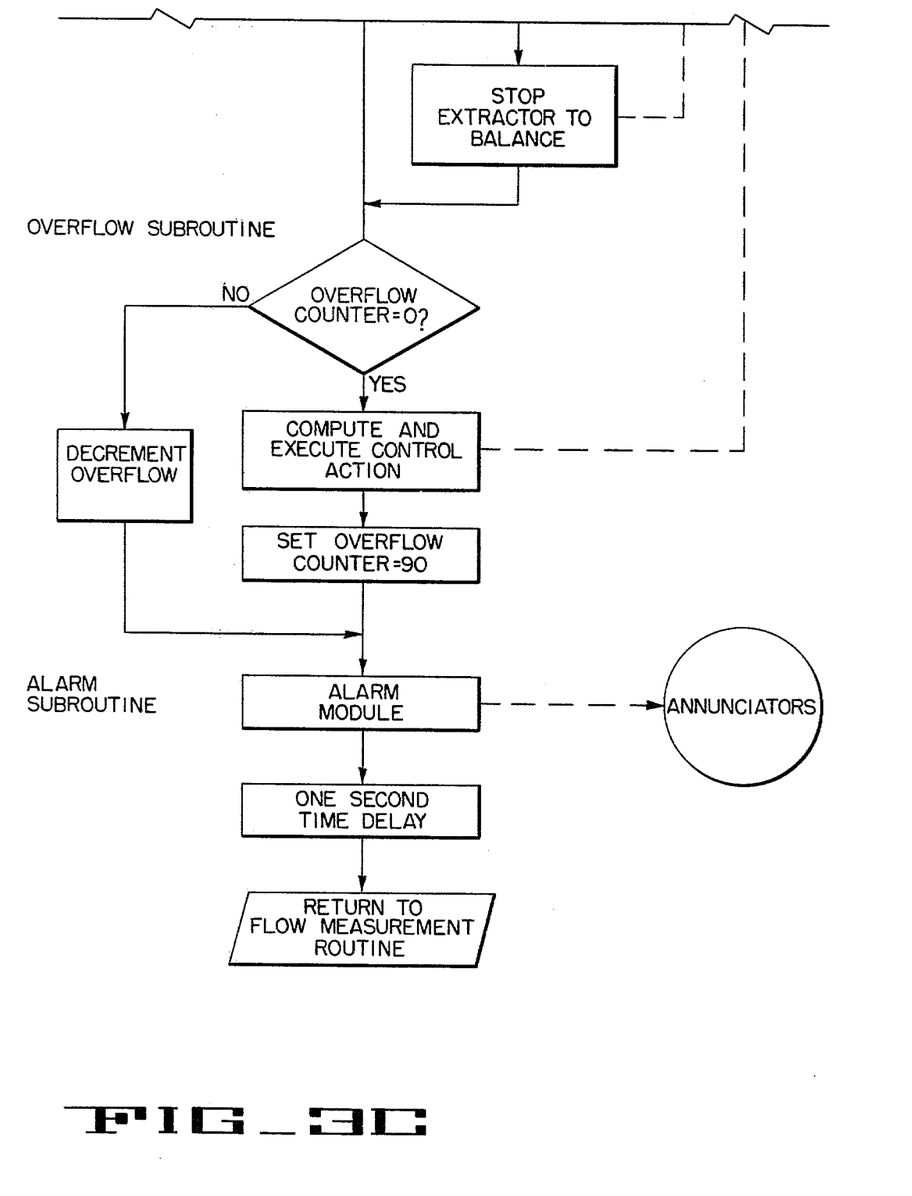

Referring to FIGS. 3A, 3B, and 3C, the programming of the CPU will be explained in detail. The CPU is adapted to operate in real time and the sequence of programming steps indicated in FIGS. 3A, 3B and 3C are initiated once each second. The program comprises six subroutines. An initialization subroutine initializes the program parameters each time the control system is started and is thereafter bypassed by the programming. A flow subroutine periodically receives information from the fruit flow sensors and stores such information in the computer memory. A level subroutine receives data from the level sensor located in the juice storage tank and, when necessary, provides the appropriate control action to maintain said level at a preselected value. A balance subroutine adjusts the sizer 18 based on the flow information input earlier in order to properly balance the load on each group of extractors 23, 24. An overflow subroutine adjusts the rate at which fruit is fed to the extractors in order to provide the proper amount of total overflow from all groups of extractors. An alarm subroutine actuates warning lights on an annunciator panel in the control room when an alarm condition exists. After all subroutines are executed, the program undergoes a one second time delay and then returns to the flow subroutine.

To avoid instability in the control system, it is necessary that each of the subroutines be carried out in the proper timed sequence. The sequence and the timing, in turn, depend on the history of adjustments already made to the process. For example, after an extractor has been stopped to lower the level in the juice storage tank 28, the program will bypass the level subroutine for 120 program cycles, approximately 2 minutes. This allows the effect of reduced juice flow to be registered on the level in the storage tank and avoid over-reaction of the control system and resultant cycling of the control system.

Program counters are the device used to control the sequence in timing in the subject program. When the program counter is equal to zero, the subroutine will be executed. When the program counter is not equal to zero, the associated subroutine will be bypassed. The initialization subroutine sets all program counters at zero and, therefore, all subroutines are executed during the first program cycle.

Referring more particularly to the flow subroutine on FIG. 3A, as the flow subroutine is entered, the program examines the flow counter. If the flow counter is greater than zero, the value in the flow counter is decremented by one and the remainder of the flow subroutine is bypassed. When the flow counter is equal to zero, the program inputs data from the fruit flow sensors 72 associated with each group of extractors. The input of information requires a sample time of 5 seconds and will be described in greater detail in connection with the description of the fruit flow sensors themselves. At present, it is necessary only to consider that the program will calculate a number between zero (0) and eighty (80) for each group of extractors. This number represents the amount of unused fruit recycled to the bulk storage location from that group of extractors. A number equal to zero (0) indicates that no fruit is being recycled, and a number equal to eighty (80) indicates that an excessive number of fruit is being recycled. A reading of forty (40) indicates the proper number of fruit is being recycled. After the fruit flow numbers are calculated and stored, the flow counter is set equal to forty (40). This means that 40 program cycles, or approximately 40 seconds, will pass before the flow subroutine is again executed.

The program next enters the level subroutine. The level counter is examined and if found greater than zero, the counter is decremented by one and the subroutine is bypassed. When the level counter is equal to zero, the level sensor 30 is read and the value is input into memory. The level sensor 30 may be of any type capable of transmitting a signal capable of being input into the CPU. For example, the sensor may be a pressure transducer with a 0-5 v. output. The analog signal is converted to digital by a conventional A/D converter.

The program next calculates the control action necessary, if any, according to a specific level control scheme. The desired level in the juice storage tank 28 is one-half full. As the level deviates from the desired level, extractors are stopped or started to alter the flow of juice to the tank. The specific extractor affected is chosen alternately between the groups of extractors 23, 24 in order to minimize the imbalance created.

If the program decides that no extractors are to be started or stopped, the program goes on to the balance subroutine (FIG. 3B). If a change is to be made, however, the program enters the execution phase of the level subroutine wherein a signal is transmitted to the appropriate extractor motor control center 44. Immediately thereafter, the program adjusts the signal to the motor speed control 46 of the feeder motor 13 to vary the feed rate to the extractors. In this way, the overflow rate from the associated group of extractors should remain approximately constant. Before entering the next subroutine, the level counter is set at 120 which means that the level subroutine will be bypassed for the next 120 program cycles. The resulting time interval of approximately 2 minutes is necessary to allow the tank level to respond to the control action just taken.

The program next enters the balance subroutine (FIG. 3B). The balance counter is examined and, if greater than zero, the balance counter is decremented by one and the balance subroutine is bypassed. When the balance counter equals zero, the program compares the overflow of each group of extractors. As stated hereinbefore, the overflow from each group of extractors is assigned a number from 0 to 80 corresponding to the amount of overflow from said group. By subtracting the overflow number of the group of small extractors 23 from that of the group of large extractors 24, a comparison number is obtained. The magnitude of that comparison number corresponds to the magnitude of the difference in overflows between the two groups of extractors, and the sign of the number corresponds to which of the groups of extractors has the larger relative overflow. The program then uses this number to enter a lookup table which relates the necessary sizer adjustment, if any. The contents of the lookup table is derived empiracally and depends on the hydraulics of the facility being controlled. If no adjustment is necessary, the program proceeds to the overflow subroutine (FIG. 3C). If an adjustment is necessary, however, the program proceeds to the execution phase of the balance subroutine.

Sizer 18 adjustment is achieved by drivng the sizer adjustment motor 42 in the appropriate direction for a predetermined period of time. A solid state relay, which is connected to a reversing motor starter on the sizer adjustment motor 42, is activated by the CPU for the predetermined amount of time in order to drive the sizer motor in the proper direction. The program then sets the balance counter to 45 which will cause the balance subroutine to be bypassed for the next 45 program cycles.

Before proceeding to the overflow subroutines, however, the program examines the limit switches 38, 39 on the sizer motor 42 to see if maximum sizer adjustment has been reached. If the maximum sizer adjustment has not been reached, the program proceeds to the overflow subroutine. If, however, there has been maximum adjustment, the program then resorts to stopping an extractor to balance the recycle from the groups of extractors. Again, a lookup table contains the necessary information for the CPU to decide which extractor is to be stopped.

Normally it will be unnecessary to resort to stopping extractor to balance the flow amount groups of extractors. The juice extraction facility will have been designed to handle the typical mix of citrus fruit sizes and any variations can be compensated for by adjusting the sizer 18. In the event, however, a truckload of citrus fruit contains an unusually high proportion of large (or small) fruit, it will be impossible to achieve a balanced flow of fruit among the groups of extractors. In that event, the most efficient manner of operating the facility is to run all extractors in the group of the predominant size category. Excess extractors in the other group are stopped and the program will subsequently adjust the fruit flow to the sizer 18 to cause the proper magnitude of recycle by means of the overflow subroutine. In this way, unnecessary power consumption is reduced. When a normal mix of fruit sizes is again encountered, the control system will respond by increasing the flow of fruit to the under-utilized group of extractors.

The program next proceeds to the overflow subroutine. The program examines the overflow counter and, if the counter is greater than zero, the counter is decremented by one and the overflow subroutine is bypassed. When the overflow counter equals zero, the program computes and executes the necessary control action. The purpose of the overflow subroutine is to provide the smallest overflow from all groups of extractors consistent with the successful functioning of the extractors. As stated earlier, the desired overflow is a single row of fruit flowing past the final extractor in the group. The program adds the recycle numbers for each group of extractors obtained during the flow subroutine and divides that number by the number of groups of extractors, e.g., two in the exemplary facility. In this way, an average overflow number is calculated. Using this average figure, the program enters a lookup table which provides the adjustment necessary for the feed rate from the fruit storage bin 10. An average overflow number of 40 indicates that no adjustment is necessary, while the number greater than 40 indicates that a reduction in feed rate is necessary. A number less than 40, of course, indicates that an increase in feed rate is necessary. After the control action is executed, the overflow counter is set to 90 and the overflow subroutine will be bypassed for the next 90 program cycles. Again, this bypass is necessary to allow the change in feed rate to be realized in a change in total overflow rate.

The next subroutine entered is the alarm subroutine which examines the process variables to see that they lie in an acceptable range. Should a variable lie outside the accepted range, an alarm is raised on an annunciator panel and the user can override the automatic control system. After a one second delay, the program returns to the flow subroutine and the cycle just described is begun again.

The control method and system of the present invention incorporates a unique approach for counting the number of fruit recycled from each group of extractors. As described hereinabove, a group of extractors comprises a plurality of individual extractors each capable of extracting the juice from several hundred citrus fruit per minute. The extractors in each group are arranged in a row and fed by a tilted-belt conveyor. The number of fruit carried by the conveyor decreases in the direction of flow thereon since the fruit are being diverted to the individual extractors. It is necessary to supply sufficient fruit to the conveyor so that each of the extractors receives an adequate supply. This is achieved by supplying a greater number of fruit to the conveyor than are consumed by the extractors. It is, however, desired to minimize the number of excess fruit in order to reduce the cost of cycling the fruit through the system and also to reduce damage to the fruit stemming from unnecessary handling. Before an attempt can be made to control this recycle, it is necessary to have an indication of the number of fruit being recycled.

Figure 4:
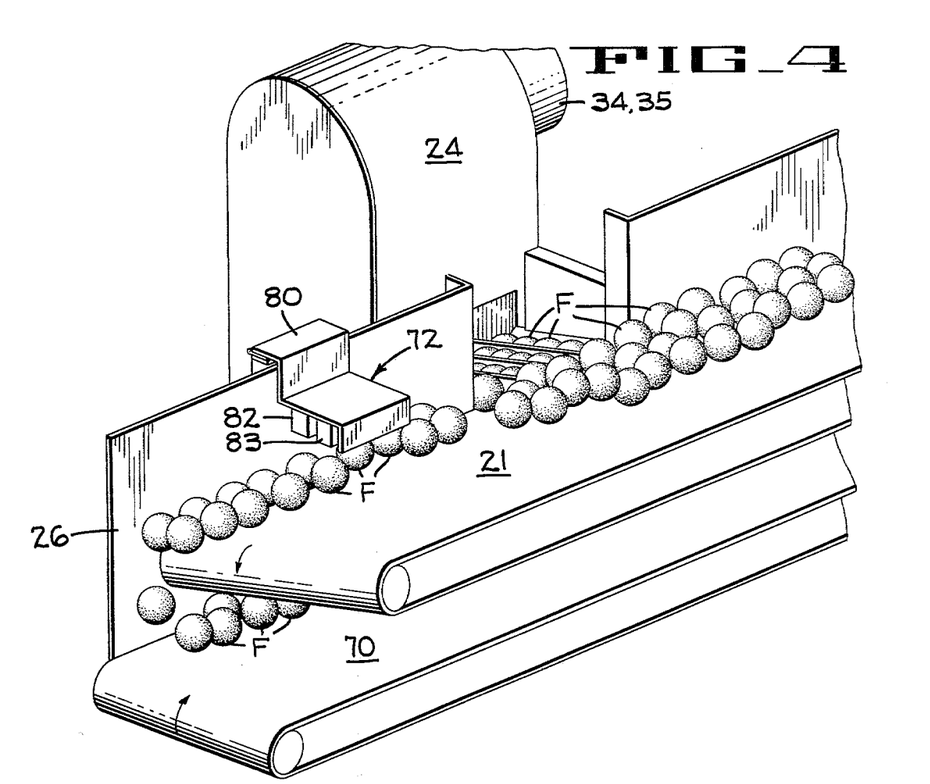
FIG. 4 is a perspective view of a portion of the tilted-belt conveyor illustrating an extractor and the flow sensor assembly.

FIG. 4 illustrates the final extractor 24 in the group of large extractors. Fruit F is carried on the tilted-belt conveyor 21 and excess fruit falls over the end of said tilted-belt conveyor onto a return conveyor 70. The direction of travel of each conveyor is indicated by an arrow thereon. It will be noted that a greater number of fruit is carried on the tilted-belt conveyor 21 upstream of the extractor 24 than downstream of said extractor. This results, of course, from the diversion of the fruit to the extractor.

It has been found that the minimum number of excess fruit to be carried by the tilted-belt conveyor corresponds to the number of fruit contained in a single file of fruit carried by that conveyor. That is, so long as a single row of fruit is carried over the end of the tilted-belt conveyor and onto the return conveyor, the final extractor will see sufficient fruit to operate properly. With fewer fruit, the final extractor will begin to experience interruptions in feed. Any more than this are excess. The present invention uses a flow sensor assembly 72 to sense the passage of fruit on the tilted-belt conveyor.

Figure 5:
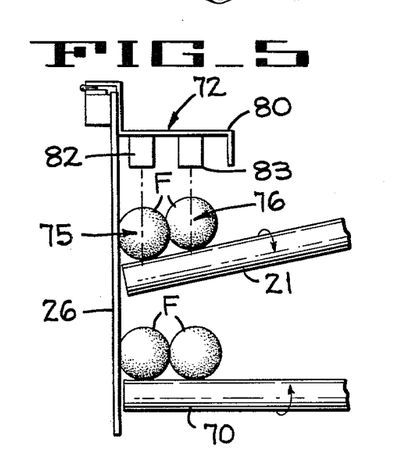
FIG. 5 is an elevation view of the flow sensor assembly.
Figure 6:
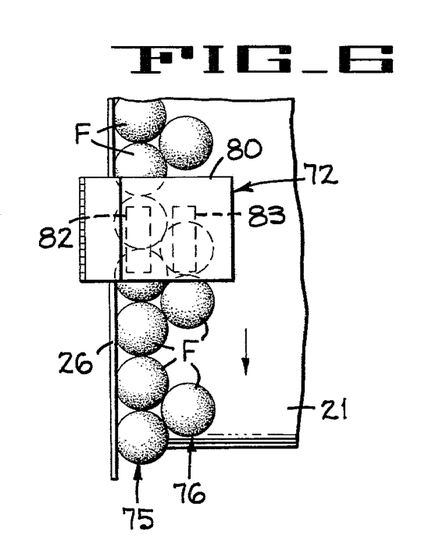
FIG. 6 is a plan view of the flow sensor assembly.

The flow sensor assembly 72 is illustrated in FIGS. 4, 5 and 6. FIG. 6 illustrates the manner in which fruit F normally align themselves on the tilted-belt. A first row 75, comprised of a number of fruit lying end to end, lies against the wall 26 as it is carried forward. A second row 76 forms adjacent to the first row 75 on the side opposite the wall 26. Note that fruit in the second row generally fall into the interstices formed between adjoining fruit in the first row. In this way, a close-packed arrangement is formed. In the region of the tilted-belt conveyor 21 beyond the last extractor, however, there will be an insufficient number of fruit to fully form two rows under preferred operating conditions. When operating with the proper overflow, it will be found that few spaces will be found in the first row 75 and few fruit at all will be found in the second row 76.

The present invention detects the fruit in the first two rows 75, 76 to determine whether the recycle from the associated group of extractors lies within the acceptable range. Each flow sensor assembly 72 comprises a bracket 80 attached to the wall 26 and extending outward therefrom above the tilted-belt conveyor 29 as illustrated in FIGS. 4, 5 and 6. The bracket 80 carries two photodetector units, a first photosensor unit 82 disposed generally above the first row 75 of fruit and a second photosensor unit 83 disposed generally above the second row 76 of fruit. Each photosensor unit includes an infrared light source directed generally downward, a photodetector with a wide angle lens capable of detecting infrared light reflected from the fruit below, logic circuitry, and output circuitry.

The photodetector senses the presence of fruit on the conveyor directly below it. When no fruit is present, the light from the infrared light source strikes the tilted-belt 20 and is reflected away from the photodetector. The output circuitry provides a 5 volt signal when fruit is present and a zero volt signal when no fruit is present. During the flow subroutine, the computer examines the output from each of the photodetectors 40 times during a period of five seconds. Each time fruit is present when the photodetector is examined, a counter in memory is incremented by one. Thus, at the end of the five second period, each pair of photodetectors in a given flow sensor assembly 72 will have a number between 0 and 80 associated with it. A number of 40 corresponds approximately to a single file of fruit. A number less than 40 indicates an inadequate recycle and a number greater than 40 indicates excessive recycle.

It is important that each flow sensor assembly 72 be properly calibrated before running the control system. This is accomplished by adjusting a time delay latching relay associated with the logic circuitry. The photodetector has an output only during the brief period when the fruit is directly beneath it. Even when the fruit passing beneath are abutting one another, there will be periods when the photodetector has no output. Thus, the time delay latching relay is provided to assure a continuous output so long as no gaps are present in the associated row of fruit. To properly calibrate the relay, it is necessary to run a continuous line of fruit beneath the photodetector while adjusting the time delay in the logic circuitry. The time delay should be adjusted to the minimum amount necessary to provide a continuous output from the photodetector while a continuous line of fruit passes underneath.

Although the best mode contemplated for carrying out the present invention has been herein shown and described, it will be apparent that modification and variation may be made without departing from what is regarded to be the subject matter of the invention.

What is claimed is:

1. A method for controlling the flow of fruit and fruit juice through a juice extraction facility, said juice extraction facility including a fruit storage location for storing the fruit in bulk, a sizer for separating the fruit into at least two size categories, said sizer being adjustable to vary the size limits of each category, a feeder for feeding the fruit from the fruit storage location to the sizer, a plurality of juice extractors, said extractors arranged in two or more groups with each group of extractors adapted to extract juice from fruit in one of said size categories, means for conveying the fruit from the sizer to the extractors according to size, means for recycling excess fruit from each group of extractors back to said storage location upstream of said group, and a juice storage location adapted to receive juice collected from all extractors, said method comprising the steps of:

measuring the amount of juice held at the juice storage location;

adjusting the number of extractors operating to maintain a preselected amount of juice at the juice storage location;

measuring the number of fruit recycled to said storage location from each group of extractors;

adjusting the size limits on the sizer so that the numbers of excess fruit recycled from each group of extractors are made substantially equal; and varying the feed rate of the feeder so that a preselected number of excess fruit are recycled from the extractors, said preselected number chosen to be the smallest number of fruit, whereby all operating extractors have fruit available at all times with a small excess of fruit.

2. A method as described in claim 1, said method comprising the additional step of adjusting the number of extractors operating in a group of extractors in order to equalize the number of fruit recycled from that group of extractors with the number of fruit recycled from the other groups of extractors.

3. A method as described in claim 1, said method comprising the additional step of varying the feed rate of fruit from the storage location whenever an extractor has been started or stopped irrespective of the number of fruit being recycled whereby a substantially constant overflow of fruit from the extractors is maintained.

* * * * *